United States Patent [19]

Lamparter

[11] Patent Number: 4,733,894

[45] Date of Patent: Mar. 29, 1988

[54] ENERGY ABSORBING VEHICLE BUMPER

[75] Inventor: Ronald C. Lamparter, Grosse Pointe Shores, Mich.

[73] Assignee: Transpec Inc., Troy, Mich.

[21] Appl. No.: 919,501

[22] Filed: Oct. 16, 1986

[51] Int. Cl.⁴ .................................................. B60R 19/08
[52] U.S. Cl. ...................................... 293/120; 293/122
[58] Field of Search ............... 293/102, 120, 122, 155, 293/121, 126, 107

[56] References Cited

U.S. PATENT DOCUMENTS

| | | | |
|---|---|---|---|
| 3,432,200 | 3/1969 | Barton | 293/122 |
| 3,656,791 | 4/1972 | Truesdell | 293/107 |
| 3,741,598 | 6/1973 | Novak et al. | 293/122 X |
| 3,827,741 | 8/1974 | Howell et al. | 293/122 |
| 4,408,790 | 10/1983 | Shimoda et al. | 293/122 |
| 4,509,782 | 4/1985 | Manning | 293/121 |
| 4,597,601 | 7/1986 | Manning | 293/122 |

*Primary Examiner*—Robert B. Reeves
*Assistant Examiner*—Russell D. Stormer

[57] ABSTRACT

The bumper system of the present invention includes a beam member adapted to span the front of a vehicle, a bracket for mounting the beam to the vehicle, and a pair of energy absorbing members supported upon the beam on the side thereof opposite from the bracket, the improvement in which system comprises the beam having a generally C-shaped cross section which includes a vertical wall portion, a pair of horizontal leg portions which project forwardly from the upper and lower edges of the vertical wall portion and each leg portion respectively terminating in an inwardly extending lip whereby said leg and lip portions respectively coact with the vertical wall to define upper and lower inwardly opening channels; each energy absorbing member comprising a hollow, rigidified and deflectable structural element which is supported upon the beam such that the major portion of the structural element projects forwardly of the beam, the structural element including: a first portion disposed forwardly of the beam; a second portion disposed within the C-shaped beam and projecting into the upper and lower beam channels; upper and lower transversely extending and outwardly opening grooves formed between the first and second portions and adapted to respectively receive the upper and lower beam lip to retain the energy absorbing member to the beam.

8 Claims, 7 Drawing Figures

ENERGY ABSORBING VEHICLE BUMPER

TECHNICAL FIELD

The subject matter of the present invention is an energy absorbing vehicle bumper of a type useful with heavy duty vehicles and particularly on buses. The bumper system of the present invention is generally of the type wherein an energy absorbing, hollow core element is formed of a relatively rigid, though deflectable, high strength plastic material and which element is mounted in front and upon a relatively stiff transverse support beam which is, in turn, adapted to be secured to a vehicle frame through a suitable rearwardly extending bracket structure.

Most current bus bumper systems are designed to withstand essentially the same type of collision requirements under conditions which will prevent damage to the bus or vehicle as well as to the bumper system. However, the specific manner in which such bumper systems have been constructed in the past varies considerably one from the other, and in general, have resulted in complicated, costly and in many cases relatively heavy systems.

It is the purpose of the present invention to provide a greatly simplified bumper system and one which is significantly lighter than systems able to withstand comparable collision impact forces. More specifically, it is the purpose of the subject invention to provide a mechanical interlocking arrangement between the support beam and the energy absorbing member.

While the bumper system of the present invention is greatly simplified and of considerably reduced weight, it is intended to meet the following typical performance standards for a front or rear mounted bus bumper: (1) it shall withstand permanent damage and bumper component deterioration when impacted repeatedly into a fixed, full-height barrier at not less than 5 m.p.h.; (2) it shall be capable of withstanding a 5 m.p.h. impact into a fixed, full-height barrier without damage to the bus or the energy absorbing bumper system; (3) the bumper system shall be capable of withstanding 10 m.p.h. head-on impact by a 4,000 pound post-1973 U.S.-type passenger car without damage to the stopped bus, the energy absorbing system or the car; (4) the bumper system shall be capable of withstanding an 8 m.p.h. impact by a 4,000 pound post-1973 U.S.-type passenger car at a 30° angle with no damage to the bus; and (5) the front bumper shall be capable of withstanding a 25 m.p.h. impact by the bus into the rear of a 4,000 pound post-1973 U.S.-type passenger car without damage to the bus structure or the energy absorbing bumper.

BACKGROUND ART

While heavy duty bumper systems have been built which are capable of meeting the above-noted collision impact requirements, they have normally been of a relatively complicated design and, therefore, costly to manufacture as well as being heavier then is to be desired.

The present bumper system is a companion to the ones previously filed by the same assignee as in the subject applications and as shown in U.S. Pat. No. 4,509,782; and in pending application Ser. No. 712,854 "Energy Absorbing Vehicle Bumper" filed Mar. 18, 1985 now U.S. Pat. No. 4,597,601 and Ser. No. 856,658 "Energy Absorbing Vehicle Bumper" filed Apr. 28, 1986.

One of the problems which arises with multi-component bumpers, and particularly those made of components comprised of different materials, is in securing the components together in such a way that they do not separate when subjected to impact-induced loads. In the present invention the transverse support beam and the deflectable energy absorbing member have been uniquely designed in such a way as to provide a mechanical interlocking relationship better able to resist separation when the bumper system is subjected to impact-induced loads. In addition, the following patents are illustrative of bumper systems which have been designed to perform in environments similar to that of the subject invention:

| | |
|---|---|
| 3,897,095 | "Resilient Bumper Assembly" - Glance et al |
| 3,902,748 | "Pneumatic Energy Absorbing Bumper System For Motor Vechicles" - Bank et al |
| 3,989,292 | "Semi-Pneumatic Energy Absorbing Bumper System For Motor Vehicles" - Bank et al |
| 3,989,292 | "Semi-Pneumatic Energy Abosrbing Bumper System For Motor Vehicles" - Bank et al |
| 4,103,951 | "Semi-Pneumatic Energy Absorbing Bumper System For Motor Vehicles" - Bank et al |

None of the foregoing structures discloses or suggests applicant's unique bumper system.

DISCLOSURE OF THE INVENTION

The subject invention generally relates to an energy absorbing vehicle bumper system of the type including horizontally extending support beam means intended to span the width of the vehicle such as a bus. Bracket means are provided for mounting the bumper system to the vehicle. Energy absorbing means are mounted upon the beam on the front side thereof and opposite from the bracket members. The energy absorbing means includes a relatively rigid, though deformable, hollow core element molded from a high strength plastic material. The most important feature of the subject invention is in providing a construction in which the support beam and energy absorbing members are mechanically interlocked in a manner which resists separation or relative movement when subjected to impact-induced loads. More specifically, the transverse support beam is formed of a C-shaped cross section which includes a vertical wall portion terminating at its upper and lower ends in forwardly extending leg portions which, in turn, terminate in vertically inwardly extending lip portions. Thus, the vertical wall portion coacts with the leg and lip portions to form inwardly opening upper and lower channel portions. At the same time, the hollow and deflectable energy absorbing member consists of a first relatively large portion which extends forwardly from the support beam and a second and smaller portion which is disposed within the C-shaped support beam. More specifically, the first and second portions of the energy absorbing means are defined by transversely extending grooves formed in the upper and lower walls of the member such that the inwardly extending lips of the beam project within the grooves while the second or smaller portion of the member is disposed within the C-shaped beam and projects within the upper and lower channels thereof so as to interlock and retain the energy absorbing member to the beam.

The preferred materials for the component of the subject bumper system are preferably the same as those described in the companion application U.S. Ser. No. 712,854. The support beam is formed of a composite reinforced plastic material and preferably made by the "pultrusion" process. Again, while other high strength or engineered plastic materials which are both relatively rigid and yet deflectable may be used for the core element, the preferred material is a polycarbonate/polybutylene terephthalate alloy developed and marketed by General Electric under the trademark XENOY.

Other features as well as the details of the invention are set forth in the drawings and the description which follows:

BEST MODE FOR CARRYING OUT THE INVENTION

While the subject system may be used for any heavy duty vehicle, it will hereinafter be referred to as being used with a bus. More specifically, the subject system uses fewer parts than the companion cases to which we have previously referred, is lighter in weight and, therefore, is particularly adaptable to smaller buses or heavy duty vehicles than the earlier noted bumper systems.

Figure 1:
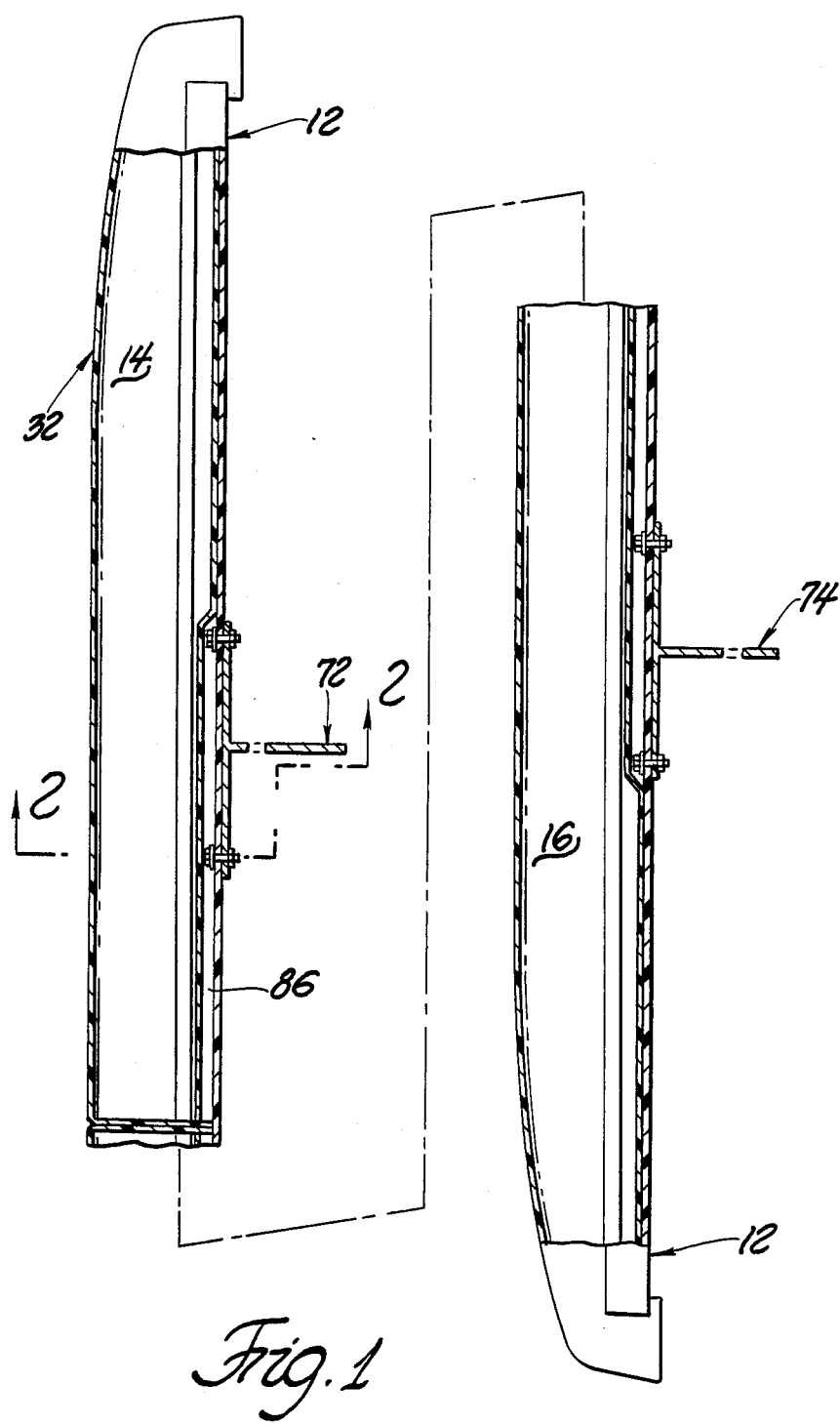
FIG. 1 is a partially sectioned plan view of the bumper structure.
Figure 2:
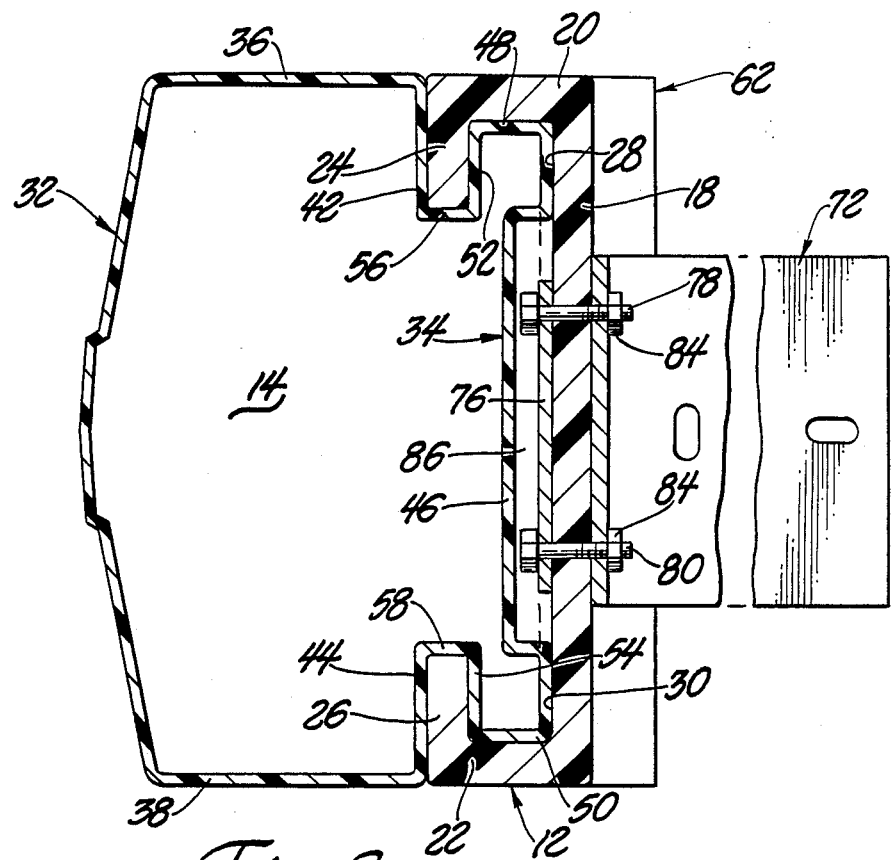
FIG. 2 is a cross-sectional view along lines 2—2 of FIG. 1.
Figure 3:
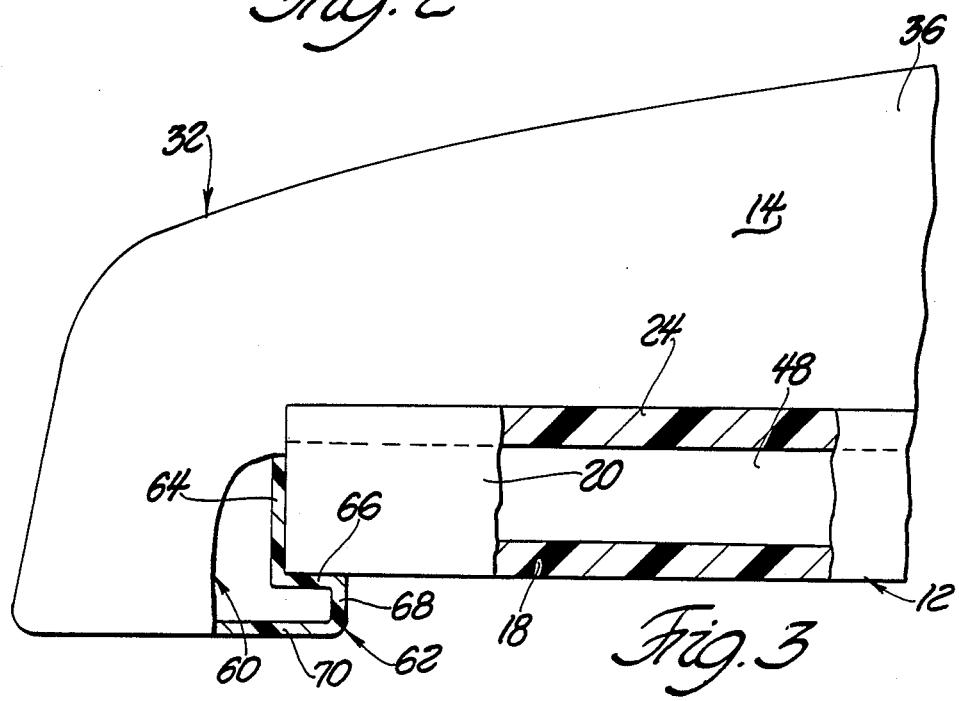
FIG. 3 is a plan view of one end of the bumper system with partial sections through the support beam and the energy absorbing member.

Referring particularly to FIGS. 1-3, the bumper system includes a single transverse support beam 12 and a pair of pre-molded, energy absorbing members 14 and 16 adapted to be mounted upon the support beam. The simplified manner in which the energy absorbing members 14 and 16 are mechanically interlocked with and supported upon the support beam 12 is one of the primary features of the subject invention, the details of which will now be described.

As best seen in FIG. 2, support beam 12 is of a C-shaped cross-section and includes a vertical wall portion 18, portions 20 and 22 extending horizontally and forwardly from the upper and lower ends of the vertical wall portion and which upper and lower portions 20 and 22, respectively, terminate in vertically inwardly extending lips 24 and 26. Thus, the vertical wall portion 18, upper and lower portions 20 and 22 along with lips 24 and 26 cooperate to define upper and lower horizontally extending and inwardly opening channels 28 and 30.

Inasmuch as the energy absorbing members 14 and 16 are identical in construction only one will be described. Again referring to FIG. 2, energy absorbing member 14 is a pre-molded, free-standing member which includes a major portion indicated generally at 32 and adapted to project horizontally forward of support beam 12 and a second smaller portion located generally at 34 adapted to be disposed within the cross-section of the support beam. Portion 32 of the energy absorbing member 14 includes upper and lower wall portions 36 and 38 which are coplanar with the upper and lower surfaces of portions 20 and 22 of the support beam. Portion 32 also includes a front wall 40 and upper and lower vertical rear walls 42 and 44 adapted to abuttingly engage the front faces of upper and lower beam lips 24 and 26.

The small portion 34 of the energy absorbing member 14 corresponds generally to the C-shaped cross-section of beam member 12 and is adapted to be primarily disposed within the inwardly opening channels 28 and 30 of the beam member. Specifically, portion 34 includes a rear wall portion 46 abuttingly engaging the front face of vertical wall portion 18 of the beam member, upper and lower horizontal walls 48 and 50 abutting against the inner faces of beam portions 20 and 22 and forward wall portions 52 and 54 abutting against the rear faces of beam lips 24 and 26. The energy absorbing portions 32 and 34 are connected by horizontally extending wall portions 56 and 58. Described slightly differently, the energy absorbing member portions 32 and 34 are formed in such a way as to define therebetween transversely extending grooves respectively defined by upper walls 42, 52 and 56 and lower walls 44, 54 and 58.

Reference is made particularly to FIG. 3 for the purpose of describing the construction of the outer most ends of energy absorbing members 14 and 16. By reference to this plan view, it will be noted that the outer end of the energy absorbing member 14 wraps around and extends rearwardly to define a portion 60 which terminates in a laterally inwardly extending portion 62 which is adapted to engage the vertical wall 18 of the support beam 12. It is to be understood that the upper and lower surfaces of the end portion 60 are coplanar extensions of upper and lower walls 36 and 38 of portion 32 of the energy absorbing member. Thus, upper surface 36, as indicated in FIG. 3, extends around to become the upper surface end portion 60.

More specifically, end portion 60 includes an inner vertical wall portion 64, a laterally inwardly extending wall portion 66 and walls 68 and 70 all of which walls coact to define the laterally inwardly projecting portion 62.

It is common for an overtaking vehicle to collide with the laterally outermost end of the bumper energy absorbing member 32 which could cause the member to separate from support beam 12. It is the purpose of forming inwardly projecting portion 62 to partially overlay the beam wall 18 to resist potential separation of the member 32 from beam 12.

As best seen in FIGS. 1 through 3, the energy absorbing members 14 and 16 are respectively mounted on the support beam 12 by aligning their transversely inner ends with the inwardly opening beam channels 28 and 30 and thereafter sliding the members inwardly along the beam until the inner wall 64 of end portion 60 abuts against the outer most end of the beam. The energy absorbing means are thus mechanically interlocked to the support beam 12 and frictionally retained thereon.

The energy absorbing members 14 and 16 are formed of a high strength plastic material having the physical characteristic of being both rigidified and yet being deflectable under impact loads as during a collision. A preferred material for this application is a polycarbonate/polybutylene terephthalate alloy which is a proprietary material developed by the General Electric Corporation and marketed under the trade name XENOY. The typical properties for this material are as follows:

| | |
|---|---|
| Specific Gravity | 1.19 |
| Specific Volume, In$^3$/LB | 23.2 |
| Tensile Strength, PSI | 7,000 |
| Flexural Strength, PSI | 10,000 |
| Flexural Modulus, PSI | 290,000 |
| Notched Izod, FT-LBS/In | |
| @ Room Temperature | 13 |
| @ −30° C. | 10 |
| Gardner Impact, In-LBS | |
| @ Room Temperature | 400 |
| @ −30° C. | 400 |

In the embodiment of the invention shown in the drawings, the wall thicknesses of members 14 and 16 are in the range of 0.200 to 0.300 inches. The hollow members are preferably formed by the blow molding process which results, at least initially in an integral and completely enclosed member.

The ultimate objective of the subject bumper system is to achieve the lightest weight and simplest structure able to withstand the required, supra, collision impact loads in a manner to avoid damage to the system and the vehicle. In view of its numerous advantages, including weight and strength, as compared to other high strength materials, it is most preferred to use a fiberglass reinforced plastic material for the support beam members 16. More specifically, such a material is preferably made by the "pultrusion" process. Referring to the schematic representation of FIG. 8, the support beam material comprises a thermo setting resin, e.g. polyester, impregnated fiberglass laminated composite having a core element C and outer layers M$_1$ and M$_2$. Core element C consists of a plurality of linear and generally parallel roving elements R which extend along the transverse length of beam 12. Core element C comprises approximately 75% of the thickness of the beam material. The outer overlaying layers M$_1$ and M$_2$ comprises approximately 12.5% of the thickness of the composite beam material. Core C and outer layers and M$_1$ and M$_2$ are completely impregnated with a thermal setting resin P, supra, to provide a suitable composite matrix.

In the preferred embodiment, the overall cross-section thickness of the composite beam material is approximately 0.625 inch.

MOUNTING BRACKETS

Figure 5:
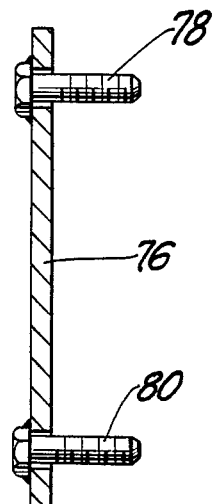
FIG. 5 is a cross-sectional view along line 5—5 of FIG. 4.
Figure 4:
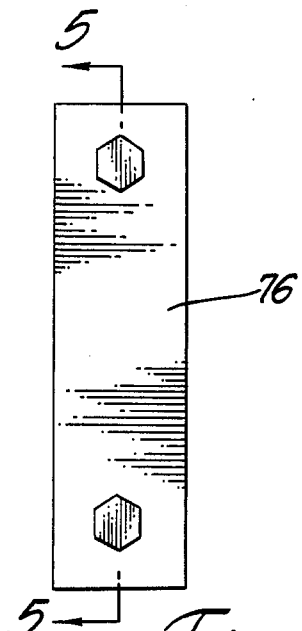
FIG. 4 is a view of one of the beam mounting bolt plates.
Figure 6:
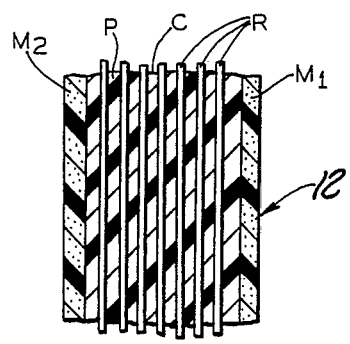
FIG. 6 is schematic representation of the cross-sectional construction of the pultruded support beam.
Figure 7:
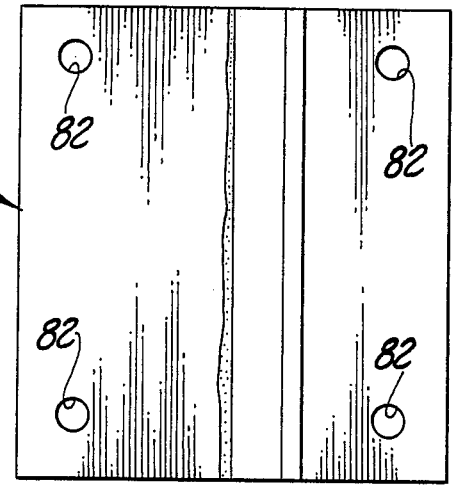
FIG. 7 is a view of a bumper supporting bracket.

In order to mount the energy absorbing bumper system to the vehicle, a pair of T-shaped brackets 72 and 74 are provided and the details of which are best seen in FIGS. 1, 2 and 7. A bolt mounting plate 76, shown in FIGS. 4 and 5, includes a pair of upper and lower bolt members 78 and 80 the heads of which are tack welded to the plate such that the threaded portion of the bolt project rearwardly and are adapted to extend through corresponding holes 82 in the front wall of the T-shaped bracket 72. As seen in FIG. 2, the bolt support plate 76 is adapted to be mounted against the front face of the vertical wall portion 18 of the support beam such that the bolt members 78 and 80 can extend through suitable holes in the beam member and the T-shaped brackets and be secured thereto by suitable nut means 84. As seen in FIG. 1, a pair of bolt supporting plates and corresponding bolts are required for each T-shaped bracket.

In order to allow each of the energy absorbing members 14 and 16 to slide over the support beam 12 and not be interferred with by the heads of bolts 78 and 80, the rear wall 46 of the energy absorbing member is forwardly recessed to provide a recess 86. As an alternative, and which variation is not shown in the drawings, the forward face of the vertical wall portion 18 of the support beam could be suitably recessed to receive the bolt mounting plate 76 and the heads of bolts 78 and 80 whereby the rear wall of the energy absorbing means could be unrecessed and yet clear the plate and bolt members as energy absorbing member slides over the beam.

It is apparent that other modifications of the energy absorbing bumper system may be made within the intended scope of the invention as set forth in the hereinafter appended claims.

What is claimed is:

1. An energy absorbing vehicle bumper system of the type including a beam member (12) adapted to span the front end of a vehicle, bracket means (72 and 74) for mounting said beam to the vehicle, and energy absorbing means (14 and 16) supported upon said beam on the side thereof opposite from the bracket means, the improvement comprising:
   A. said beam (12) having a generally C-shaped cross-section and including
      (1) a vertical wall portion (18);
      (2) a pair of horizontal leg portions (20 and 22) projecting forwardly from the upper and lower edges of the vertical wall portion and each leg portion respectively terminating in an inwardly extending lip (24 and 26) portion whereby said leg and lip portions respectively coact with the vertical wall to define upper and lower inwardly opening channels (28 and 30);
   B. each energy absorbing means (14 and 16) comprising a hollow, rigidified and deflectable structural member being supported upon said beam such that the major portion of said structural member projects forwardly of said beam, said structural member including
      (1) a first portion (32) disposed forwardly of the beam;
      (2) a second portion (34) disposed within the C-shaped beam and projecting into said upper and lower beam channels;
      (3) upper and lower transversely extending and outwardly opening grooves formed between said first and second portions (32 and 34) and adapted to respectively receive the upper and lower beam lips (24 and 26) to retain the energy absorbing means to the beam (12);
      (4) an end portion (70) extending transversely and rearwardly beyond the beam member (12) such that the transversely outer end of said beam abuts against an inner wall (64) of said end portion.

2. An energy absorbing vehicle bumper system of the type set forth in claim 11 wherein said beam member (12) and each structural member portion (32) include coplanar upper (20 and 36) and lower (22 and 38) wall portions.

3. An energy absorbing vehicle bumper system of the type set forth in claim 12 wherein the end portion (70) of each structural member includes upper and lower surfaces which comprise coplanar extensions of the upper and lower surfaces (36 and 38) of the structural member portion (32).

4. An energy absorbing vehicle bumper system of the type set forth in claim 3 wherein the end portion (70) of each structural member terminates in a laterally inwardly projecting portion (52) adapted to overlay the rear face of the vertical wall (18) of beam (12).

5. An energy absorbing vehicle bumper system of the type set forth in claim 1 wherein each structural member (14 and 16) includes an end portion (70) extending transversely and rearwardly beyond the beam member (12) such that the transversely outer ends of said beam abuts against an inner wall (64) of each end portion.

6. An energy absorbing vehicle bumper system of the type set forth in claim 5 wherein the end portion (70) of each structural member includes upper and lower surfaces which comprise coplanar extensions of the upper and lower surfaces (36 and 38) of the structural member portion (32).

7. An energy absorbing vehicle bumper system of the type set forth in claim 6 wherein the end portion (70) of each structural member terminates in a laterally inwardly projecting portion (62) adapted to overlay the rear face of the vertical wall (18) of the beam (12).

8. An energy absorbing vehicle bumper system of the type including a beam member (12) adapted to span the front end of a vehicle, bracket means (72 and 74) for mounting said beam to the vehicle, and energy absorbing means (14 and 16) supported upon said beam on the side thereof opposite from the bracket means, the improvement comprising:

A. said beam (12) having a generally C-shaped cross-section and including
  (1) a vertical wall portion (18);
  (2) a pair of horizontal leg portions (20) and 22) projecting forwardly from the upper and lower edges of the vertical wall portion and each leg portion respectively terminating in an inwardly extending lip (24 and 26) portion whereby said leg and lip portions respectively coact with the vertical wall to define upper and lower inwardly opening channels (28 and 30);
B. each energy absorbing means (14 and 16) comprising a hollow, rigidified and deflectable structural member being supported upon said beam such that the major portion of said structural member projects forwardly of said beam, said structural member including
  (1) a first portion (32) disposed forwardly of the beam, said first portion having upper and lower wall portions (36 and 38) respectively abutting and coplanar with the horizontal leg portions (20 and 22) of said beam (12);
  (2) a second portion (34) disposed within the C-shaped beam and projecting into said upper and lower beam channels;
  (3) upper and lower transversely extending and outwardly opening grooves formed between said first and second portions (32 and 34) and adapted to respectively receive the upper and lower beam lips (24 and 26) to retain the energy absorbing means to the beam (12).

* * * * *